United States Patent

Huiban et al.

[11] Patent Number: 5,844,732
[45] Date of Patent: Dec. 1, 1998

[54] MECHANISM FOR THE ISOSTATIC FITTING OF A FRAGILE ELEMENT SUCH AS A MIRROR, MORE PARTICULARLY USABLE ON A SPACECRAFT

[75] Inventors: Thierry Huiban; Bruno Bailly, both of Mandelieu, France

[73] Assignee: Aerospatiale Societe Nationale Industrielle, France

[21] Appl. No.: 524,852

[22] Filed: Sep. 7, 1995

[30] Foreign Application Priority Data

Sep. 7, 1994 [FR] France .................................. 94 10710

[51] Int. Cl.⁶ .................................................. G02B 7/182
[52] U.S. Cl. .......................... 359/872; 359/849; 359/224
[58] Field of Search .................................. 248/475.1, 479, 248/476, 487; 359/224, 225, 216, 871, 872, 874, 876, 222, 846, 847, 848, 849

[56] References Cited

U.S. PATENT DOCUMENTS

| | | | |
|---|---|---|---|
| 4,681,408 | 7/1987 | Ahmad et al. | 359/848 |
| 4,726,671 | 2/1988 | Ahmad et al. | 359/848 |
| 4,978,207 | 12/1990 | Gillner et al. | 359/871 |

*Primary Examiner*—Ricky D. Shafer
*Attorney, Agent, or Firm*—Hayes, Soloway, Hennessey, Grossman & Hage, P.C.

[57] ABSTRACT

A mechanism for isostatic fitting of a fragile element, such as a mirror, to a support, generally carried on board a spacecraft, is provided. The mechanism includes three identical connecting devices circumferentially distributed around the optical axis of the mirror. Each device has a flexible blade or plate, whose longitudinal axis is preferably oriented in a direction tangential to a circle centered on the optical axis. The cross-section of the flexible blade decreases progressively from a first end fixed to the support to a second end fixed to the mirror, through a deformable member. The deformable member is adapted to flex in order to permit a relative rotation about a radially oriented axis. The fixtures to the support and the mirror are provided by rods operating only in tension and compression.

19 Claims, 3 Drawing Sheets

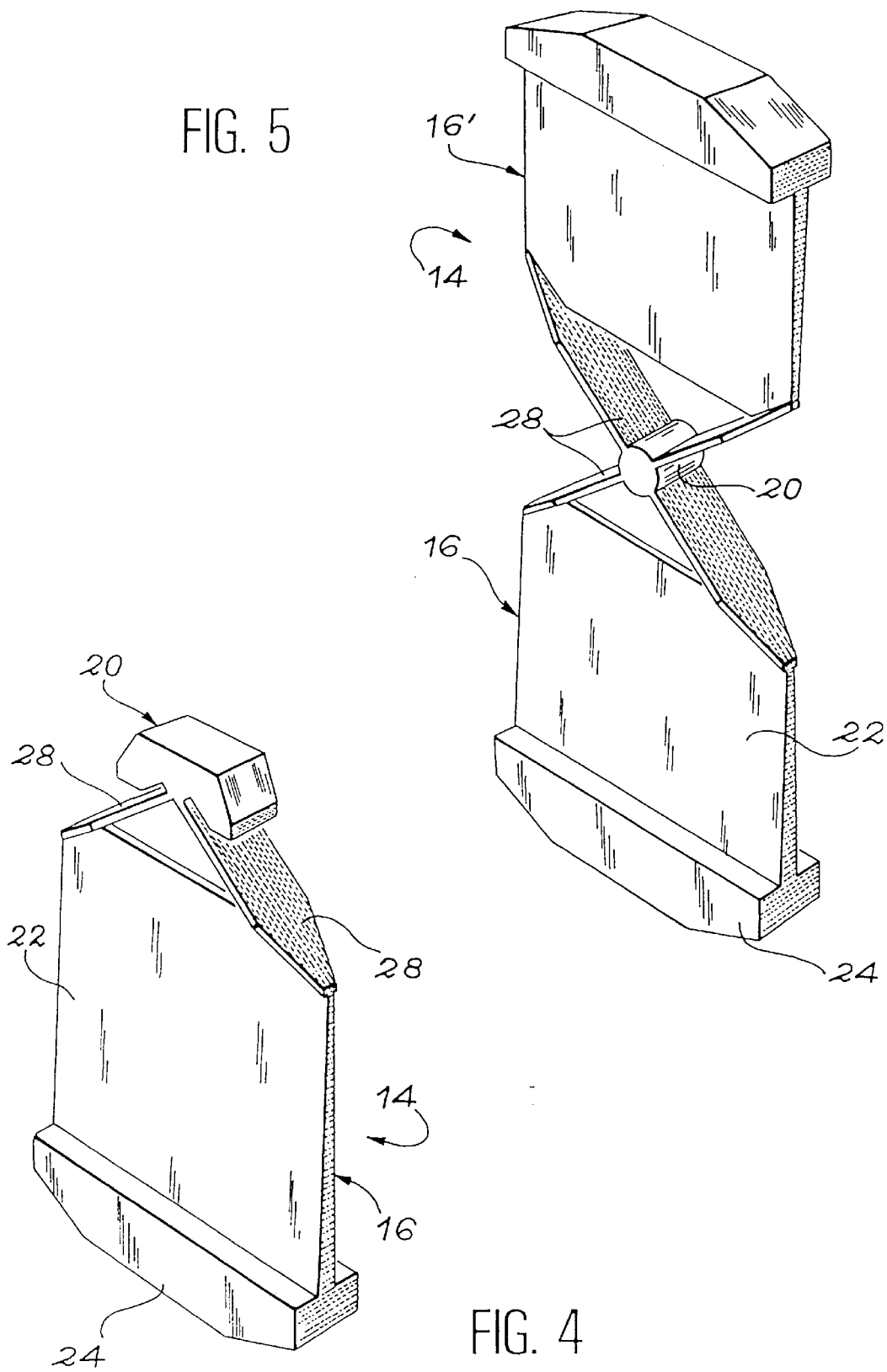

MECHANISM FOR THE ISOSTATIC FITTING OF A FRAGILE ELEMENT SUCH AS A MIRROR, MORE PARTICULARLY USABLE ON A SPACECRAFT

BACKGROUND OF THE INVENTION

1. Field of the invention

The invention relates to a mechanism for ensuring the isostatic fitting of a fragile element such as a mirror to a support. Such a mechanism can be used in all cases where a fragile element, e.g. belonging to an optical system, has to be accurately positioned in an invariable manner, even in the case of a differential expansion between the element and its support, so that significant forces can be absorbed without damage and in particular without introducing stresses liable to damage the fragile element.

A preferred, but not exclusive application of such a mechanism relates to the fitting of a fragile element such as a mirror of an optical system to a spacecraft such as a satellite, space probe, space telescope, etc. In said application, the optical axis of the mirror, as well as its focus and focal distance must be invariable. However, the optical system undergoes particularly high temperature variations, particularly on passing from a shadow area to a lighted area. Moreover, during the launch of the spacecraft the optical system is exposed to particularly high acceleration, which must be absorbed by the mirror fitting mechanism. Thus, the mirror must be isostatically supported by said mechanism.

2. Description of Prior Art

Various mechanisms have already been proposed for bringing about the isostatic fitting of a fragile element such as a mirror to a support carried on a spacecraft. For example, in FR-A-2,534,663, the mirror is fixed to a support carried by a satellite by means of three devices circumferentially distributed about the optical axis of the mirror. Each device comprises a flexible blade placed in a plane substantially tangential to a cylindrical surface centered on the optical axis. More precisely, the longitudinal axis of each flexible blade extends parallel to said axis. Each of the flexible blades is V-shaped and its apex is rigidly fixed to a base plate of a X, T, Y or V beam. The opposite end of the beam is fixed by embedding or flush mounting to the mirror and the opposite ends of the two branches of the V formed by the blade are fixed by embedding or flush mounting to the support. The flexible blade and the beam can be made in one piece by machining or can be fixed to one another by a universal joint, locked by a nut during fitting. When they are made in one piece, the flexible blade and the beam can be made from Invar (registered trademark).

In this mechanism, the flexible blades have a rigidity, in the circumferential and axial directions, which ensures the desired positioning of the mirror and makes it possible to absorb the forces produced during the launch of the satellite. The bending of the blade makes it possible to take account of differential expansions between the mirror and its support allowing both a relative displacement in the radial direction, a relative rotation about an axis parallel to the optical axis and a relative rotation about an axis tangential to a cylindrical surface centered on said optical axis. Finally, the beam by which the flexible blade is connected to the mirror is arranged so as to operate in torsion, so as to allow a relative rotation about an axis oriented radially with respect to the optical axis.

Although the general characteristics are satisfactory, said mechanism suffers from certain disadvantages. Firstly, the use of a beam operating in torsion in order to permit a rotary displacement about an axis oriented radially with respect to the optical axis requires a beam with a certain length, which leads to an unsatisfactory increase in the radial overall dimensions. The limitation to said dimensions leads to the shortening of the beam and consequently to an increase in the stiffness. Therefore undesirable stresses may be applied to the mirror.

Moreover, as the flexible blades are oriented substantially parallel to the optical axis, the differential expansions can lead to displacements of the mirror parallel to its optical axis of approximately 1 $\mu$m. In certain cases, such displacements are incompatible with the general tolerances of the optical system.

Finally, fastenings by embedding which take place on the mirror and on the support do not ensure a perfect positioning stability when the mechanism is subject to intense forces, especially when launching the satellite. Thus, the tolerances of the connections by embedding impose a minimum clearance of approximately 10 $\mu$m and the screws ensuring the connections cannot be locked with excessive tightening forces, because otherwise irreversible deformations would be produced in the mirror and/or in its support.

Another isostatic fitting mechanism is described in FR-A-2,503, 387. This mechanism uses flexible blades having a uniform cross-section, which are connected to the mirror by a system of three braces, each formed by two interlaced laminations. The central brace, is flexible and permits an angular deflection about an axis oriented radially with respect to the optical axis and the two lateral braces allow an angular displacement about an axis oriented tangentially with respect to a cylindrical surface centered on the optical axis.

This mechanism essentially has the same disadvantages as the previous mechanism. Thus, the group of three braces by which each of the blades is connected to the mirror significantly increases costs and overall dimensions of the mechanism. The flexible blades are also oriented in the direction of the optical axis, which leads to a non-negligible axial displacement of the mirror under the effect of temperature variations. Finally, no proposal is made for solving the problem of the connections by embedding connecting the mechanism to the mirror and to its support.

SUMMARY OF THE INVENTION

The main object of the invention is to provide an isostatic fitting mechanism, whose original design permits the reduction of its overall dimensions and costs, with out introducing any supplementary constraint or stress into the fragile element supported by said mechanism.

According to the invention, this object is achieved by means of a mechanism for the isostatic fitting of a fragile element such as a mirror to a support, comprising three connecting devices circumferentially distributed about a longitudinal axis of the fragile element, each of these connecting devices comprising a first flexible blade located substantially in a plane tangential to a cylindrical surface centered on said longitudinal axis, a first end of the flexible blade being fixed to the support and a second end of the flexible blade being connected to the fragile element by a deformable member, allowing a relative rotation between the fragile element and its support, about an axis oriented radially with respect to said longitudinal axis, characterized in that the flexible blade has a cross-section which decreases progressively from its first end to its second end, the deformable member being a member able to deform in flexion in order to permit said relative rotation about said radially oriented axis.

The use of a flexible blade having an evolutive section makes it possible to use a simplified deformable member. Due to the fact that said member operates in flexion, its overall dimensions can be very small without residual stresses being produced in the mirror. Therefore the mechanism according to the invention is simpler, less costly and less cumbersome than the known mechanisms. However, the isostatic character of the fitting and the resistance to high forces are ensured under conditions comparable to those characterizing the known mechanisms. In a preferred embodiment of the invention, the deformable member has at least two laminations intersecting in said radially oriented axis and whose ends are respectively fixed to the second end of the flexible blade and to a part connected to the fragile element.

As a function of the particular case, the laminations then form an X or a V. The laminations, the flexible blade and the part connected to the fragile element can be made separately or, conversely, in one piece.

In a special embodiment of the invention, the part connected to the fragile element is a second flexible blade which is identical and coplanar to the first flexible blade and whose cross-section decreases progressively from a first end fixed to the support to a second end fixed to the laminations.

Advantageously, the axial displacements of the fragile element produced by temperature variations are reduced by orienting the longitudinal axis of each of the flexible blades in a direction tangential to a circle centered on the axis of the fragile element.

As a variant, the longitudinal axis of the flexible blades can be oriented in the axial direction, particularly when the fragile element has small dimensions. The flexible blades are then made from a material with a very low heat expansion coefficient, such as Invar (registered trademark).

To increase the buckling resistance of the flexible blades, each of them has preferably at least one rib extending parallel to its longitudinal axis.

Advantageously, a good stability of the fragile element is ensured, without producing any stress liable to damage said element or its support, by fixing the aforementioned part to the fragile element and the flexible blade to the support by two pairs of fixing rods intersecting the radially oriented axis at right angles and a relative rotation about said axis between the fragile element and its support is made possible by the crossed laminations.

Preferably, the fixing rods are then arranged symmetrically with respect to the longitudinal axis of the flexible blade.

The invention is described in greater detail hereinafter relative to non-limiting embodiments and the attached drawings, wherein:

BRIEF DESCRIPTION OF THE DRAWINGS

FIG. 4 is a perspective view comparable to FIG. 3 showing another embodiment of the invention.

FIG. 5 is a perspective view comparable to FIGS. 3 and 4 illustrating yet another embodiment of the invention.

DETAILED DESCRIPTION OF PREFERRED EMBODIMENTS

Figure 1:
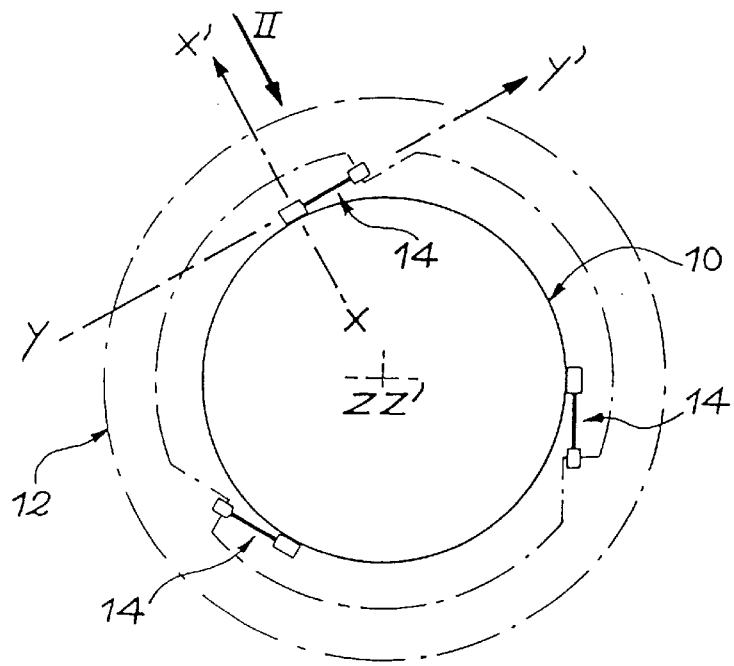
FIG. 1 a front view diagrammatically showing a mechanism for the isostatic fitting of a mirror to a support according to the invention.

In FIG. 1, the reference 10 generally designates a fragile element such as a mirror forming part of a more complex optical system, e.g. a space telescope. This mirror 10, seen from the front in FIG. 1, has a longitudinal axis constituted by an optical axis ZZ' perpendicular to the plane of the drawing.

The mirror 10 is isostatically fitted to a support 12, whereof only the contour is shown in mixed line form in FIG. 1. This suppport 12 has in this case the shape of a ring arranged around the mirror 10 and centered on its optical axis ZZ'. It is fixed in a random manner to the not shown structure of a spacecraft.

According to the invention, the isostatic fitting of the mirror 10 to the support 12 is ensured by a mechanism having three connecting devices 14 circumferentially distributed about the optical axis ZZ'. These three connecting devices 14 are identical and only one of them will now be described, in a first embodiment of the invention with reference to FIGS. 2 and 3.

Each connecting device 14 firstly consists of a generally planar, flexible blade or plate 16, which is placed in a plane tangential to a cylindrical surface centered on the optical axis ZZ'. More specifically, in the embodiment illustrated in FIGS. 1 to 3, the longitudinal axis of the blade 16 is oriented in a direction YY' circumferential or tangential to a circle centered on the optical axis ZZ'. This arrangement avoids high temperature variations bringing about an unacceptable displacement of the mirror 10 parallel to its optical axis ZZ'.

Figure 2:
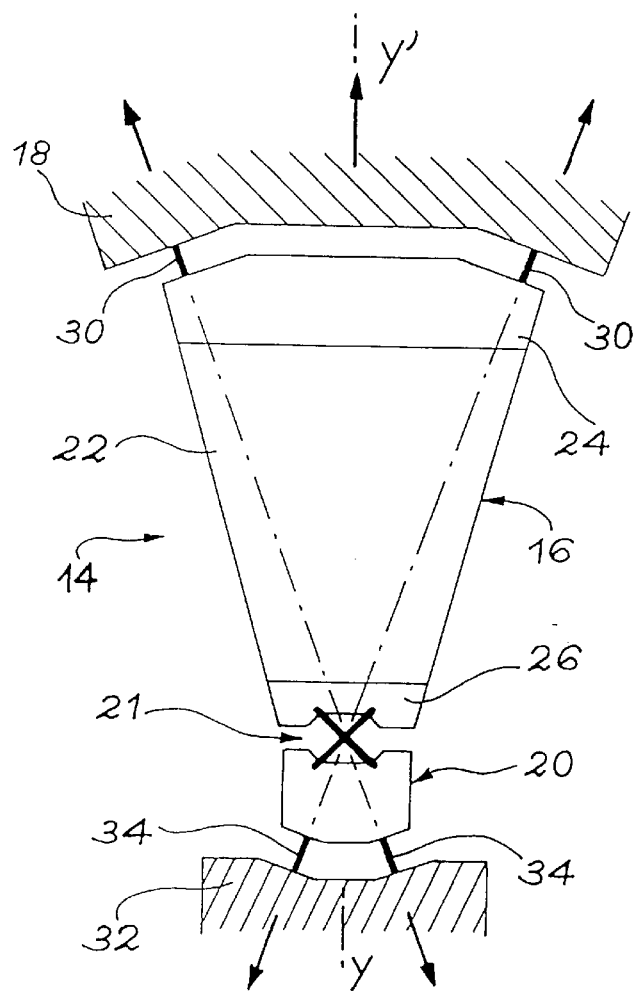
FIG. 2 is a view in along the direction indicated by arrow II in FIG. 1 diagrammatically showing one of the connecting devices of the isostatic fitting mechanism of FIG. 1.

As is more particularly illustrated in FIG. 2, the flexible blade 16 has, in plan view, substantially the shape of an isosceles trapezoid, whose large base is fixed to a block 18 integral with the support 12 and whose small base is connected to a part 20 by a deformable member 21. Thus, the width of the flexible blade 16 decreases progressively from its end fixed to the block 18 to its end connected to the part 20 by the deformable member 21.

Figure 3:
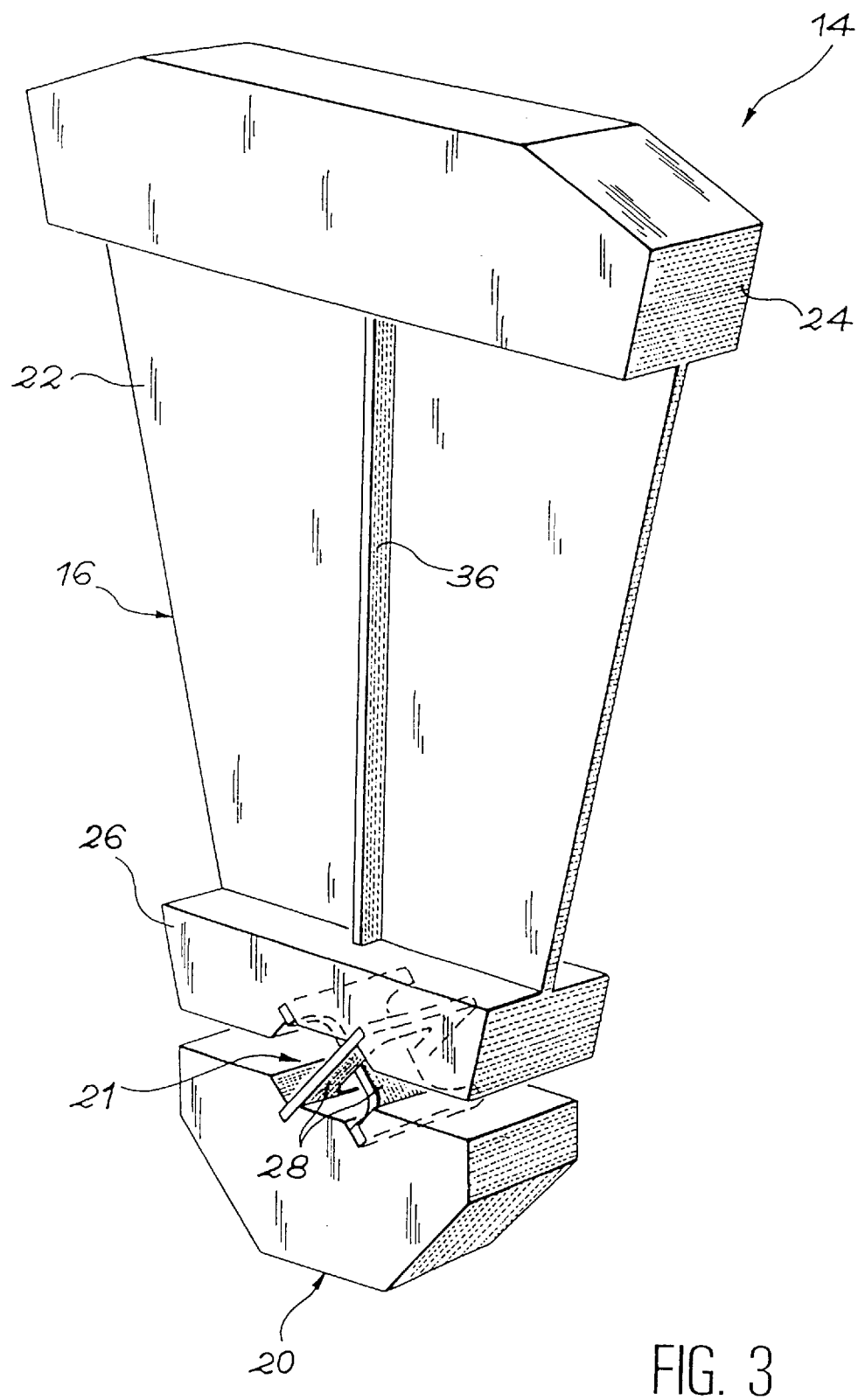
FIG. 3 is a perspective view showing in greater detail part of the connecting device of FIG. 2.

As is more specifically illustrated in FIG. 3, most of the flexible blade 16 is formed by a main portion 22 having a uniform, relatively small width, which constitutes the actual blade. To permit the connection with the contiguous parts, the blade 16 is terminated at each of its ends by a thicker portion. This thicker portion is designated by the reference 24 for the end corresponding to the large base of the isosceles trapezoid and by 26 for the end corresponding to the small base of said trapezoid.

Advantageously, the main portion 22 of the flexible blade 16 has on each of its faces at least one rib or flange 36 oriented parallel to its longitudinal axis. In the embodiment illustrated in FIG. 3, a single rib is provided in said longitudinal axis. It makes it possible to increase the buckling resistance of the flexible blade 16.

The deformable member 21 by which the end portion 26 of the flexible blade 16 is connected to the part 20 is designed so as to be able to deform in flexion so as to permit a relative rotation between the mirror 10 and its support 12, about an axis XX' (FIG. 1) oriented radially with respect to the optical axis ZZ'.

In the embodiment illustrated in FIGS. 2 and 3, the deformable member 21 has two flexible laminations 28 intersecting along the axis XX', so as to form an X in plan view. The ends of each of the flexible laminations 28 are respectively fixed to the end portion 26 of the flexible blade 16 and to the part 20. This fixture can in particular be produced by an embedding technique (brazing, coupling, etc.).

As illustrated in FIG. 3, one of the flexible laminations 28 has a rectangular shape and has a central window through which passes a reduced width, central portion of the other flexible lamination. In order to ensure that the flexing deformation behavior patterns of the two flexible laminations 28 are identical, the sections of said laminations, at the point where they intersect according to the axis XX', are identical. The part 20 has substantially the same thickness as the end portions 24,26 of the flexible blade 16.

As is diagrammatically shown in FIG. 2, the flexible blade 16 is connected by its end portion 24 to the block 18 integral with the support 12 by a first pair of fixing rods 30. In comparable manner, the part 20 is fixed to a block 32 integral with the mirror 10 by a second pair of fixing rods 34. The fastenings ensured by these rods 30 and 34 are such that there is no direct contact between the flexible blade 16 and the block 18 or between the part 20 and the block 32. All the forces withstood by the mechanism are consequently transmitted through the rods 30 and 34.

As illustrated in ghost in FIG. 2, the fixing rods 30,34 intersect at right angles the axis XX' oriented radially with respect to the optical axis ZZ'. Moreover, the rods 30 and 34 of each of the pairs are arranged symmetrically with respect to the longitudinal axis YY' of the flexible blade 16.

Due to the fact that all the forces withstood by the mechanism pass through the radial axis XX' which passes through the deformable member 21, said forces will make the fixing rods 30,34 operate solely in tension and compression. No matter what the intensity of the forces applied to the mechanism, the stability of the positioning of the mirror 10 relative to the support 12 is guaranteed, contact being of the positive abutment type, thereby preventing microdisplacements which could occur in the case of connections by friction.

In practice, the fixing rods 30,34 can be constituted by bolts or tie rods traversing tubular spacers, which maintain the spacing between the parts.

In the embodiment described hereinbefore relative to FIGS. 2 and 3, the flexible blade 16, the part 20 and the flexible laminations 28 of the deformable member 21 constitute parts which are separately machined and then assembled. However, in the embodiments which will now be described relative to FIGS. 4 and 5, said parts are produced simultaneously in the same machined block.

Thus, in the embodiment of FIG. 4, the two flexible blades 28 constituting the deformable member 21 are obtained by machining in a single block, in which are also formed the flexible blade 16 and the part 20.

In the embodiment of FIG. 4, the progressive decrease in the section of the flexible blade 16 from the end portion 24 to be fixed to the support 12 (FIG. 1) to the opposite end connected to the part 20 by the flexible laminations 28 is no longer ensured by a width decrease, but by a progressive decrease in the thickness of the main portion 22 of said blade.

Another difference between the embodiment of FIG. 4 and that described relative to FIGS. 2 and 3 concerns the elimination of the end portion 26 of the flexible blade 16, used in FIGS. 2 and 3 for the embedding of the corresponding ends of the flexible laminations 28. The ends of the flexible laminations 28 are consequently directly fixed to the main portion 22 of the flexible blade 16.

Moreover, instead of being formed from two crossed laminations 28 in such a way as to form a X in plan view, as in the embodiment of FIGS. 2 and 3, the deformable member 21 is formed from two laminations 28 in this case intersecting to form a V in plan view. The apex of the V, which defines the rotation axis XX' by flexing of the laminations 28, is then directly integral with the part 20.

The fastenings of the end portion 24 to the support 12 and the part 20 to the mirror 10 take place in the manner described relative to FIG. 2.

In the second embodiment of the invention described relative to FIG. 4, the connecting devices 14 have a more compact character than in the first embodiment. Therefore these connecting devices 14 can be used for supporting a smaller mirror 10. Instead of being oriented in accordance with an axis YY' tangential to a cylindrical surface centered on the optical axis ZZ', the longitudinal axis of the flexible blade 16 can then be oriented parallel to the optical axis ZZ', according to a more conventional arrangement.

Under these conditions, the machined block in which are formed the flexible blade 16, the flexible laminations 28 and the part 20 is advantageously made from a material having a very low heat expansion coefficient, such as Invar (registered trademark).

The embodiment of FIG. 5 has numerous similarities with that described relative to FIG. 4. Thus, the connecting device 14 is constituted by two subassemblies as illustrated in FIG. 4 and arranged symmetrically, said device 14 being produced by machining in a single block. The flexible blade 16 also has the same characteristics as that described relative to FIG. 4.

In the embodiment of FIG. 5, the second subassembly has a second flexible blade 16', whose shape and dimensions are the same as for the flexible blade 16. Moreover, the flexible laminations 28 constituting the deformable member 21 intersect to form an X, whose ends are respectively fixed to the flexible blade 16 and to the flexible blade 16'.

In this case, as the flexible laminations 28 are produced in one piece with the flexible blade 16,16', they are connected to one another, along the radial axis XX' defined by a block or cylindrical bulge 20.

In the embodiment of FIG. 5, the flexible blade 16 and the blade 16', are completely symmetrical relative to the radial axis X,X' defined by the cylindrical bulge 20.

As the overall dimensions of the connecting device 14 of FIG. 5 are larger than in the case of FIG. 4, the longitudinal axis of said device is advantageously positioned in the tangential direction YY', as in the case of the device described relative to FIGS. 2 and 3.

In this case, the fastenings of the element 14 to the support 20 take place by means of the parts 24,24'. The block 32, integral with the mirror, is fixed to the part 20. These fastenings take place in the same way as described relative to FIG. 2.

It should be noted that the different embodiments described hereinbefore can be modified and combined with one another in different ways without passing outside the scope of the invention. Thus, ribs comparable to the rib 28 can be provided on other flexible blades equipping the connecting devices 14 described with reference to FIGS. 4 and 5. Moreover, the progressive evolution of the cross-section of the blade can be obtained by combining a width change and a thickness change of the blade. Finally, instead of being solid and free from any perforations as in the embodiments described, the flexible blades can have recesses without passing outside the scope of the invention.

We claim:

1. A mechanism for isostatic fitting of a fragile element to a support, comprising three connecting devices circumferentially distributed about a longitudinal axis of the fragile element, each of the connecting devices comprising a first flexible blade located substantially in a plane tangential to a cylindrical surfaced centered on said longitudinal axis, a first end of the flexible blade being fixed to the support and a second end of the flexible blade being connected to the fragile element by a deformable member, said flexible blade and said deformable member being adapted to flex so as to permit a relative rotation between the fragile element and the support about an axis oriented radially with respect to said longitudinal axis to occur, wherein the flexible blade has a cross-section which decreases from the first end of said blade to the second end of said blade, and the deformable member and said flexible blade are also adapted to substantially prevent relative axial displacement between said fragile element and said support from occurring.

2. A mechanism according to claim 1, wherein the deformable member has at least two laminations intersecting along said radially oriented axis and whose ends are respectively fixed to the second end of the flexible blade and to a part connected to the fragile element.

3. A mechanism according to claim 2, wherein the laminations form an X.

4. A mechanism according to claim 2, wherein the laminations form a V.

5. A mechanism according to claim 2, wherein the laminations, the flexible blade, and said part are made in one piece.

6. A mechanism according to claim 2, wherein said part is a second flexible blade, identical and coplanar to the first flexible blade and whose cross-section decreases from a first end fixed to the support to a second end fixed to the laminations.

7. A mechanism according to claim 2, wherein said part is fixed to the fragile element and the flexible blade is fixed to the support by two pairs of fixing rods which intersect at right angles said radially oriented axis.

8. A mechanism according to claim 7, wherein the fixing rods are arranged symmetrically relative to a longitudinal axis of the flexible blade.

9. A mechanism according to claim 7, wherein the fixing rods ensure a positive abutment connection preventing micro-sliding.

10. A mechanism according to claim 1, wherein each of the flexible blades has at least one rib extending parallel to a longitudinal axis of said blade.

11. A mechanism according to claim 1, wherein each of the flexible blades has a longitudinal axis oriented in a direction tangential to a circle centered on the axis of the fragile element.

12. A mechanism according to claim 1, wherein each of the flexible blades has a longitudinal axis oriented in a direction parallel to the longitudinal axis of said fragile element and made from a material having a very low heat expansion coefficient.

13. A mechanism according to claim 1, wherein the deformable member has ends which are respectively affixed to the second end of the flexible blade and to part connected to the fragile element, said part and said flexible blade being fixed to the fragile element and to the support, respectively, by two respective pairs of fixing rods, said fixing rods comprising tie rods traversing tubular spacers.

14. A mechanism according to claim 1, wherein the flexible blade includes first and second flexible blade subassemblies, and said deformable member has at least two laminations intersecting along said radially oriented axis and having ends which are respectively fixed to the first and second blade subassemblies.

15. A mechanism according to claim 14, wherein said laminations form an X.

16. A mechanism according to claim 14, wherein said deformable member includes a cylindrical portion at which said laminations intersect.

17. A mechanism according to claim 14, wherein each of said blade subassemblies includes two ends and has a cross-section which decreases from one of said two ends to the other of said two ends.

18. A mechanism according to claim 14, wherein each of said blade subassemblies is substantially solid.

19. A mechanism according to claim 14, wherein each of said blade subassemblies has at least one rib.

\* \* \* \* \*

UNITED STATES PATENT AND TRADEMARK OFFICE
CERTIFICATE OF CORRECTION

PATENT NO. : 5,844,732
DATED : December 1, 1998
INVENTOR(S) : Huiban et al

It is certified that error appears in the above-identified patent and that said Letters Patent is hereby corrected as shown below:

Claim 11, Col. 8, line 6, please insert - -longitudinal- - before "axis".

Signed and Sealed this

Twenty-sixth Day of October, 1999

Attest:

Q. TODD DICKINSON

*Attesting Officer*   *Acting Commissioner of Patents and Trademarks*